(12) United States Patent
Nakra

(10) Patent No.: US 8,589,627 B2
(45) Date of Patent: Nov. 19, 2013

(54) PARTIALLY SECTORED CACHE

(75) Inventor: Tarun Nakra, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 377 days.

(21) Appl. No.: 12/869,988

(22) Filed: Aug. 27, 2010

(65) Prior Publication Data

US 2012/0054443 A1 Mar. 1, 2012

(51) Int. Cl.
*G06F 12/08* (2006.01)

(52) U.S. Cl.
USPC .......................................... 711/118; 711/129

(58) Field of Classification Search
None
See application file for complete search history.

(56) References Cited

U.S. PATENT DOCUMENTS

| | | | | |
|---|---|---|---|---|
| 4,493,026 | A * | 1/1985 | Olnowich | 711/128 |
| 5,210,845 | A * | 5/1993 | Crawford et al. | 711/128 |
| 6,349,363 | B2 * | 2/2002 | Cai et al. | 711/129 |
| 6,665,775 | B1 * | 12/2003 | Maiyuran et al. | 711/129 |
| 7,437,513 | B2 * | 10/2008 | Saida et al. | 711/128 |
| 2009/0083489 | A1 * | 3/2009 | Clark et al. | 711/129 |
| 2009/0144506 | A1 * | 6/2009 | Barth et al. | 711/129 |

* cited by examiner

*Primary Examiner* — Matthew Bradley
*Assistant Examiner* — Ramon A Mercado

(57) ABSTRACT

The present invention provides embodiments of a partially sectored cache. One embodiment of the apparatus includes a cache that includes a tag array for storing information indicating a plurality of tags and a data array for storing a plurality of lines. A first portion of the tags have a one-to-one association with a first portion of the lines and a second portion of the tags have a one-to-many association with a second portion of the lines.

20 Claims, 4 Drawing Sheets

PARTIALLY SECTORED CACHE

BACKGROUND OF THE INVENTION

1. Field of the Invention

This invention relates generally to processor-based systems, and, more particularly, to a partially sectored cache that may be implemented in a processor-based system.

2. Description of the Related Art

Many processing devices utilize caches to reduce the average time required to access information stored in a memory. A cache is a smaller and faster memory that stores copies of instructions and/or data that are expected to be used relatively frequently. For example, central processing units (CPUs), which are but one type of processor, are generally associated with a cache or a hierarchy of cache memory elements. Other processors, such as graphics processing units, can also implement cache systems. Instructions or data that are expected to be used by the CPU are moved from (relatively large and slow) main memory into the cache. When the CPU needs to read or write a location in the main memory, it first checks to see whether a copy of the desired memory location is included in the cache memory. If this location is included in the cache (a cache hit), then the CPU can perform the read or write operation on the copy in the cache memory location. If this location is not included in the cache (a cache miss), then the CPU needs to access the information stored in the main memory and, in some cases, the information can be copied from the main memory and added to the cache. Proper configuration and operation of the cache can reduce the average latency of memory accesses to a value below the main memory latency and close to the cache access latency.

One widely used architecture for a CPU cache memory is a hierarchical cache that divides the cache into two levels known as the L1 cache and the L2 cache. The L1 cache is typically a smaller and faster memory than the L2 cache, which is smaller and faster than the main memory. The CPU first attempts to locate needed memory locations in the L1 cache and then proceeds to look successively in the L2 cache and the main memory when it is unable to find the memory location in the cache. The L1 cache can be further subdivided into separate L1 caches for storing instructions (L1-I) and data (L1-D). The L1-I cache can be placed near entities that require more frequent access to instructions than data, whereas the L1-D can be placed closer to entities that require more frequent access to data than instructions. The L2 cache is typically associated with both the L1-I and L1-D caches and can store copies of instructions or data that are retrieved from the main memory. Frequently used instructions are copied from the L2 cache into the L1-I cache and frequently used data can be copied from the L2 cache into the L1-D cache. Some CPU architectures also implement additional cache levels such as the higher-level L3 cache, which is typically larger and slower than the L2 cache.

A conventional caching architecture uses tags to identify the addresses of information stored in the lines of the cache. In physically tagged caches, the tag represents the upper bits of the physical address of a memory location. For example, when the CPU attempts to access information at a particular physical address, it first checks the tag array to see if the information located at that physical address has been copied into a line or block of the data array of the cache. The CPU determines whether the desired information has been stored in a line of the cache by comparing the cache tags with the tag bits of the desired memory location. If there is a tag match, the CPU can access the information directly from the cache. In a conventional (non-sectored) data array, each cache line is associated with a tag that is stored in a tag array. The tag array occupies a chip area that increases in proportion to the size of the non-sectored cache because of the one-to-one relationship between tags and lines in the data array. The power consumed by the tag array also increases in proportion to the size of the non-sectored cache. The large area and the large power consumption of tag arrays may be detrimental to the design and/or performance of larger caches such as L2 and L3 cache arrays.

The size and power consumption of the tag array can be reduced by using sectored caches. In a sectored cache, each tag refers to more than one line (or sub block) in the data array. A CPU can determine whether information at a particular physical address is located in the cache by accessing the tag array to determine whether the information at the particular physical address is stored in any of the multiple lines associated with a tag in the tag array. The one-to-many association of tags to lines can reduce the size and power consumption of the tag array for a given number of cache lines because fewer tags are needed to identify the information stored in the data array. However, fully sectored caches have higher latency because a wider granularity of data must be read from and written to the main memory. For example, data for all the lines identified by a tag is copied each time information in one line associated with the tag is modified. Moreover, the reduction in the power consumption of the tag array must be balanced against the power penalty incurred by always having to fetch all of the sub-blocks associated with a tag in the fully sectored cache even when the CPU only requests a subset of the sub-blocks identified by the tag. One option to reduce the power penalty is to only fetch the sub-block requested by the CPU. But that approach suffers from performance degradation due to unused sub-blocks (holes) within a sector.

The cache tag array can also be decoupled from the data array so that tags are dynamically allocated to data lines. This approach can create a one-to-many mapping between the tag array and the data array using pointers to connect lines that include sequentially information. For example, a first tag can be assigned to a line of the data array when information is copied from the main memory to this line of the data array. If information is accessed sequentially from the main memory and copied to a second line in the data array, then the first tag can also be used to indicate the data in the second line using a pointer from the first line to the second line. Additional pointers can be used to link additional sequentially accessed lines. When the CPU checks the tag array, the physical address can be compared to the first tag to determine if the physical address of the data requested by the CPU is stored in the first or second lines. If there is a cache hit, the first tag and the pointers can be used to access the information in the requested line. Using pointers to link the cache lines associated with a single tag can reduce the size and power consumption of the tag array. However, the area and power savings are mitigated by the additional pointer bits used to connect the data and the tags, as well as the additional logic that is needed to traverse the pointers during line replacement.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, an apparatus is provided for a partially sectored cache. One embodiment of the apparatus includes a cache that includes a tag array for storing information indicating a plurality of tags and a data array for storing a plurality of lines. A first portion of the tags have a one-to-one association with a first portion of the lines and a second portion of the tags have a one-to-many association with a second portion of the lines.

In one embodiment, a method is provided for operating a partially sectored cache. One embodiment of the method includes storing information indicating a plurality of tags in a tag array of a cache and storing a plurality of lines in a data array of the cache. A first portion of the tags have a one-to-one association with a first portion of the lines and a second portion of the tags have a one-to-many association with a second portion of the lines.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
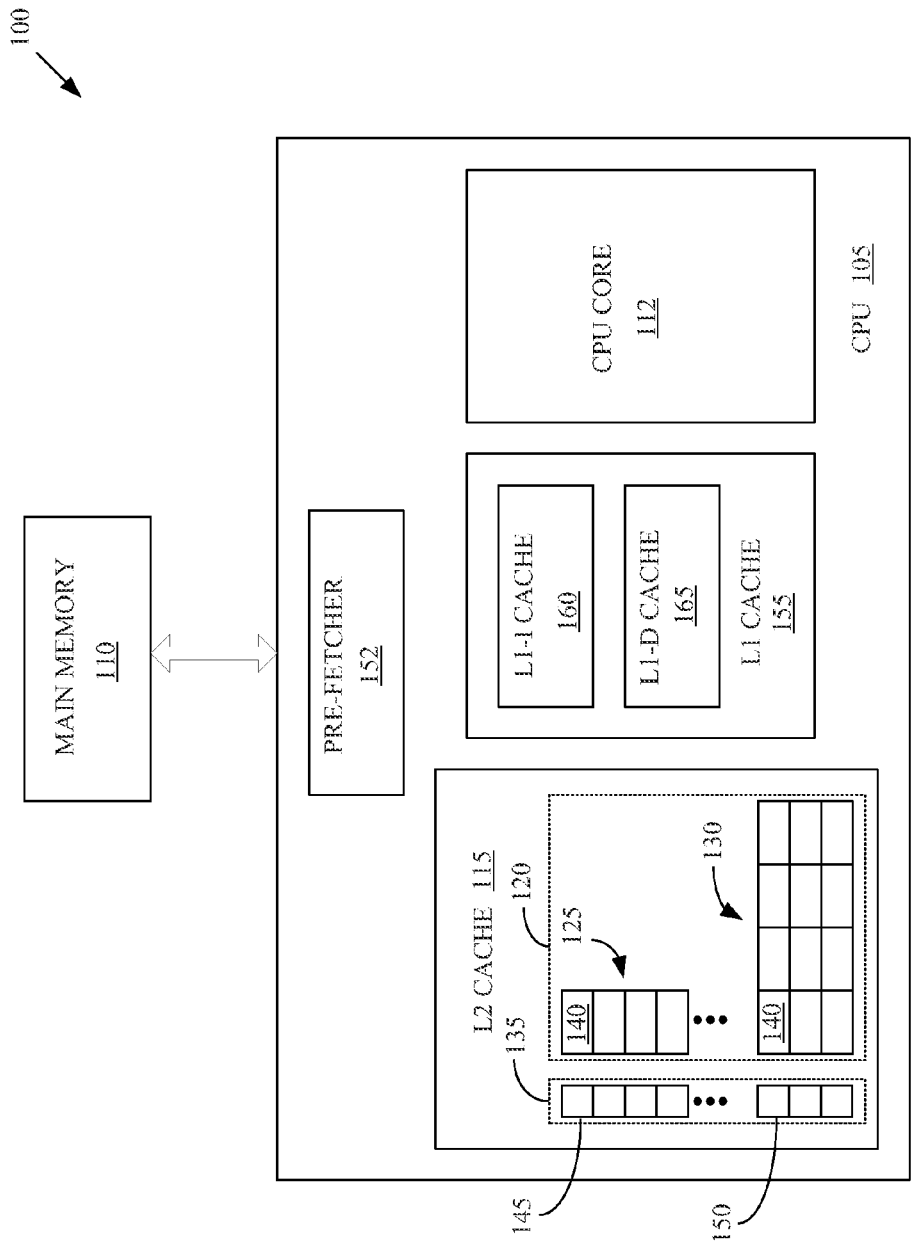
FIG. 1 conceptually illustrates a first exemplary embodiment of a semiconductor device that may be formed in or on a semiconductor wafer.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of techniques for implementing and/or operating cache memory elements that can be used to balance the competing demands for low latency, low power consumption, and minimal chip area to implement tag arrays for the cache memory. Exemplary embodiments of the cache memory include a tag array and a data array. The ways of the cache are partitioned into multiple groups so that one group of tags has a one-to-one association with a non-sectored portion of the lines in the cache and another group of tags has a one-to-many association with a sectored of the lines. The non-sectored ways can store lines of data that are filled in by demand requests from a core processor associated with the cache. The sectored ways include multiple lines of data that appear back-to-back in the physical address space of a main memory associated with the cache. The data lines within a sector are represented by a single address tag and the sectored ways can be filled in with lines requested by the processor core while accessing memory sequentially.

FIG. 1 conceptually illustrates a first exemplary embodiment of a semiconductor device 100 that may be formed in or on a semiconductor wafer (or die). The semiconductor device 100 may formed in or on the semiconductor wafer using well known processes such as deposition, growth, photolithography, etching, planarising, polishing, annealing, and the like. In the illustrated embodiment, the device 100 includes a processor such as a central processing unit (CPU) 105 that is configured to access instructions and/or data that are stored in the main memory 110. As will be appreciated, other processors such as digital signal processors (DSPs), graphics processing units (GPUs) and the like or combinations of DSPs, GPUs, CPUs possibly with other processors are also possible. However, in the illustrated embodiment, the CPU 105 includes a CPU core 112 that is used to execute the instructions and/or manipulate the data. The CPU 105 also implements a hierarchical (or multilevel) cache system that is used to speed access to the instructions and/or data by storing selected instructions and/or data in the caches. However, persons of ordinary skill in the art having benefit of the present disclosure should appreciate that alternative embodiments of the device 100 may implement different configurations of the CPU 105, such as configurations that use external caches.

The illustrated cache system includes a level 2 (L2) cache 115 for storing copies of instructions and/or data that are stored in the main memory 110. In the illustrated embodiment, the L2 cache 115 is 16-way associative to the main memory 110 so that each line in the main memory 110 can potentially be copied to and from 16 particular lines (which are conventionally referred to as "ways") in the L2 cache 115. However, persons of ordinary skill in the art having benefit of the present disclosure should appreciate that alternative embodiments of the main memory 110 and/or the L2 cache 115 can be implemented using any associativity. Relative to the main memory 110, the L2 cache 115 may be implemented using smaller and faster memory elements. The L2 cache 115 may also be deployed logically and/or physically closer to the CPU core 112 (relative to the main memory 110) so that information may be exchanged between the CPU core 112 and the L2 cache 115 more rapidly and/or with less latency.

In the illustrated embodiment, a data array 120 of the L2 cache 115 is partitioned into a non-sectored portion 125 and a sectored portion 130. A tag array 135 is used for accessing the information stored in the non-sectored portion 125 and/or the sectored portion 130. For example, the non-sectored portion 125 can include one or more lines 140 of 64 bytes of information, which may be read from and/or written to the main memory 110. Tags 145 in the tag array 135 that are associated with the non-sectored portion 125 have a one-to-one relationship with the lines 140 in the non-sectored portion 125. The sectored portion 130 can also include lines 140 of information that can be read from and/or written to the main memory 110 area. The data in the non-sectored portion 125 does not get duplicated in the lines within the sectored portion 130. Tags 150 that are associated with the sectored portion 130 have a one-to-many relationship to the lines 140 in the sectored portion 130. In the illustrated embodiment, the tags 150 have a one-to-four relationship to the lines 140. However, persons of ordinary skill in the art having benefit of the present disclosure should appreciate that this particular relationship is intended to be illustrative and alternative embodiments may use different one-to-many relationships for different sectoring architectures.

A pre-fetcher 152 can be used to populate the lines 140 in the sectored array 130. In one embodiment, the pre-fetcher 152 can monitor memory requests associated with applications running in the CPU core 112. The pre-fetcher 152 may determine or predict that the CPU core 112 is likely to access a particular sequence of memory addresses in the main memory 110. For example, the pre-fetcher 152 may detect sequential memory accesses by the CPU core 112 and predict future memory accesses by extrapolating based upon the current and/or previous sequential memory accesses. The pre-fetcher 152 can then fetch the information in the predicted addressed locations in the main memory 110 and store this information in the sectored array 130 so that the information is available in the cache 115 before it is requested by the CPU core 112. Since the pre-fetcher 152 can predict accesses to sequential locations in memory, fewer tags (than data lines) can be used to hold those locations within the sectored array 130. Techniques for implementing and operating pre-fetching algorithms are known in the art and in the interest of clarity only those aspects of pre-fetching that are relevant to the claimed subject matter are discussed herein.

The illustrated cache system also includes an L1 cache 155 for storing copies of instructions and/or data that are stored in the main memory 110 and/or the L2 cache 115. Relative to the L2 cache 115, the L1 cache 155 may be implemented using smaller and faster memory elements so that information stored in the lines of the L1 cache 155 can be retrieved quickly by the CPU 105. The L1 cache 155 may also be deployed logically and/or physically closer to the CPU core 112 (relative to the main memory 110 and the L2 cache 115) so that information may be exchanged between the CPU core 112 and the L1 cache 155 more rapidly and/or with less latency (relative to communication with the main memory 110 and the L2 cache 115). Persons of ordinary skill in the art having benefit of the present disclosure should appreciate that the L1 cache 155 and the L2 cache 115 represent one exemplary embodiment of a multi-level hierarchical cache memory system. Alternative embodiments may use different multilevel caches including elements such as L0 caches, L1 caches, L2 caches, L3 caches, and the like.

In the illustrated embodiment, the L1 cache 155 is separated into level 1 (L1) caches for storing instructions and data, which are referred to as the L1-I cache 160 and the L1-D cache 165. Separating or partitioning the L1 cache 155 into an L1-I cache 160 for storing only instructions and an L1-D cache 165 for storing only data may allow these caches to be deployed closer to the entities that are likely to request instructions and/or data, respectively. Consequently, this arrangement may reduce contention, wire delays, and generally decrease latency associated with instructions and data. In one embodiment, a replacement policy dictates that the lines in the L1-I cache 160 are replaced with instructions from the L2 cache 115 and the lines in the L1-D cache 165 are replaced with data from the L2 cache 115. However, persons of ordinary skill in the art should appreciate that alternative embodiments of the L1 cache 155 may not be partitioned into separate instruction-only and data-only caches 160, 165.

In operation, because of the low latency, the CPU 105 first checks the L1 caches 155, 160, 165 when it needs to retrieve or access an instruction or data. If the request to the L1 caches 155, 160, 165 misses, then the request may be directed to the L2 cache 115, which can be formed of relatively larger and slower memory elements than the L1 caches 155, 160, 165. The main memory 110 is formed of memory elements that are larger and slower than the L2 cache 115 and so the main memory 110 may be the object of a request that missed in both the L1 caches 155, 160, 165 and the unified L2 cache 115. The caches 115, 155, 160, 165 can be flushed by writing back modified (or "dirty") cache lines to the main memory 110 and invalidating other lines in the caches 115, 155, 160, 165. Cache flushing may be required for some instructions performed by the CPU 105, such as a RESET or a write-back-invalidate (WBINVD) instruction. In some embodiments, one or more of the caches 115, 155, 160, 165 may be partitioned into sectored and non-sectored portions as discussed herein.

Figure 2A:
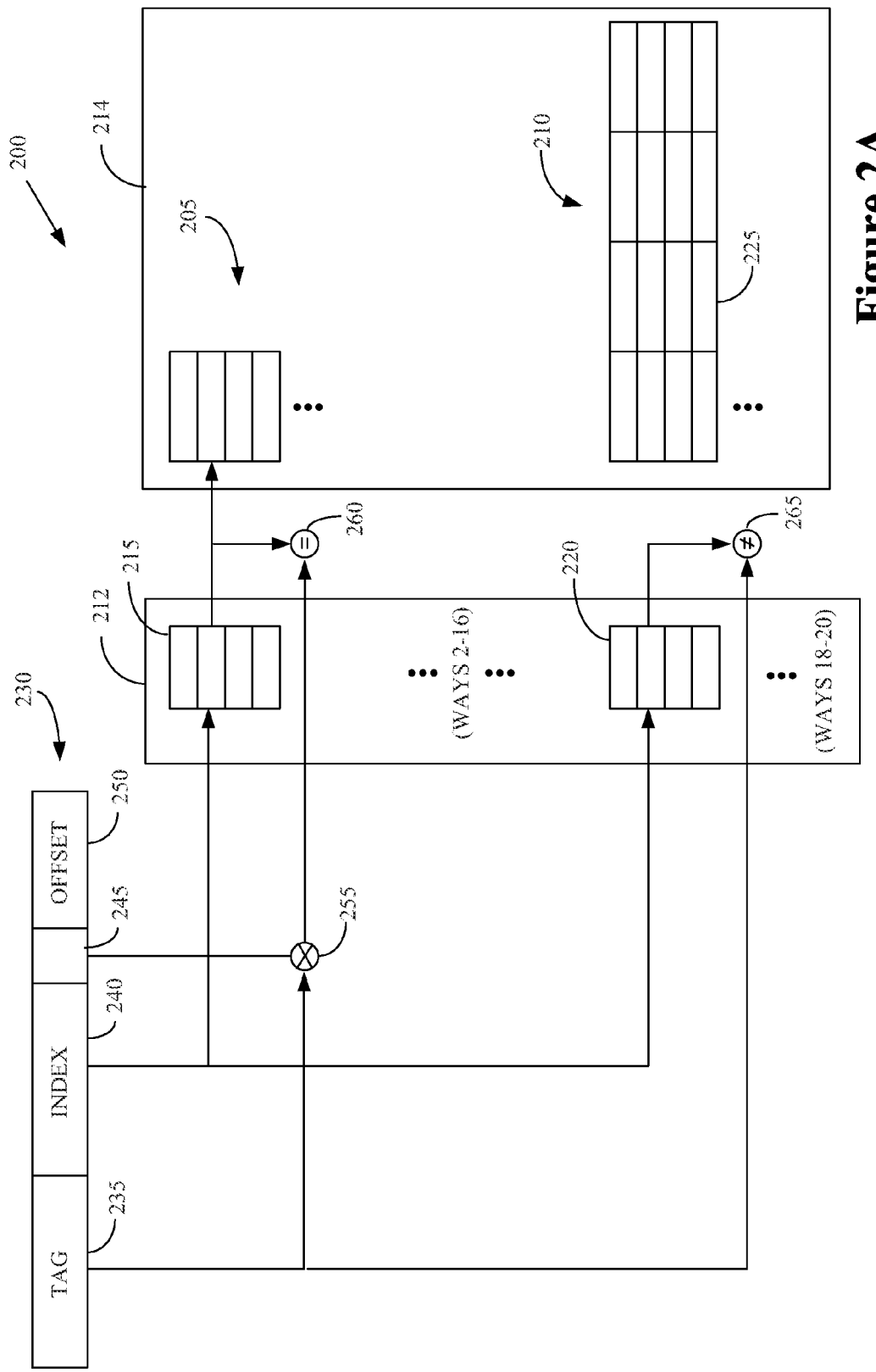
FIG. 2A conceptually illustrates a first exemplary embodiment of a cache that is partitioned into a non-sectored array and a sectored array.

FIG. 2A conceptually illustrates a first exemplary embodiment of a cache 200 that is partitioned into a non-sectored array 205 and a sectored array 210. In the illustrated embodiment, the cache 200 is 20-way associative and is partitioned into the non-sectored array 205 and the sectored array 210 on the basis of the ways of the associative cache 200. For example, a tag array 212 and a data array 214 in the cache 200 can be partitioned so that each cache index includes 16 non-sectored ways and 4 sectored ways. The first way 215 (along with ways 2-16) is included in the non-sectored array 205 and the 17th way 220 (along with ways 18-20) is included in the sectored array 210. In the illustrated embodiment, each way includes tags/lines associated with four indexes. Each sectored way maps 256B-aligned data to the same cache index. For example, each block in the sectored array 210 includes four sub-blocks 225 (only one indicated by a distinguishing numeral in FIG. 2) and each sub-block 225 includes 64 bytes of information that is sequential with adjacent sub-blocks 225. Persons of ordinary skill in the art having benefit of the present disclosure should appreciate that the cache structure shown in FIG. 2 is intended to be illustrative. Alternative embodiments of the cache 200 may use different numbers of lines, indexes, ways, bytes, blocks, and/or sub-blocks, as well as a different partitioning of the ways into the non-sectored array 205 and the sectored array 210.

A physical address 230 can be used to access the information in the cache 200. In the illustrated embodiment, the physical address 230 includes a tag 235 that can be compared to the information in the tag arrays 212 to determine whether the information stored at the physical address 230 has been cached in the cache array 200. The physical address 230 also includes an index 240 that is used to determine which cache index to search in each of the ways, one or more selectors bits 245 that can be used (sometimes in combination with the tag 235) to identify cache hits in the non-sectored array 205 and/or to select one of the sub-blocks following a cache hit to one of the lines in the sectored array 210. One or more offset bits 250 are used to identify particular bytes within the lines or sub blocks, e.g. 6 bits to identify individual bytes in a 64 byte line. In one embodiment, the physical address 230 is used to access the information associated with the different ways in parallel so that tags for each way in the tag array 212 associated with the index 240 are concurrently searched to detect cache hits and/or cache misses.

In the embodiment depicted in FIG. 2A, the index 240 indicates that the second index in each way should be examined to detect potential cache hits and/or cache misses. The tag 235 and the selector bits 245 are concatenated (at 255) and compared to the tags at the appropriate index location in the non-sectored portion of the tag array 212. The tag 235 is compared to the tags at the appropriate index location in the sectored portion of the tag array 212. In the illustrated embodiment, a cache hit is detected in the first way 215 because the combination of the tag 235 and the selector bits 245 is determined (at 260) to be equal to the tag in the first way of the tag array 212. The corresponding line in the first way associated with the first index in the sectored array 205 can then be accessed to retrieve the requested information. A cache miss is detected in the 17th way 220 because the tag 235 is determined (at 265) to be different than the tag at the appropriate index location in the 17th way 220.

Figure 2B:
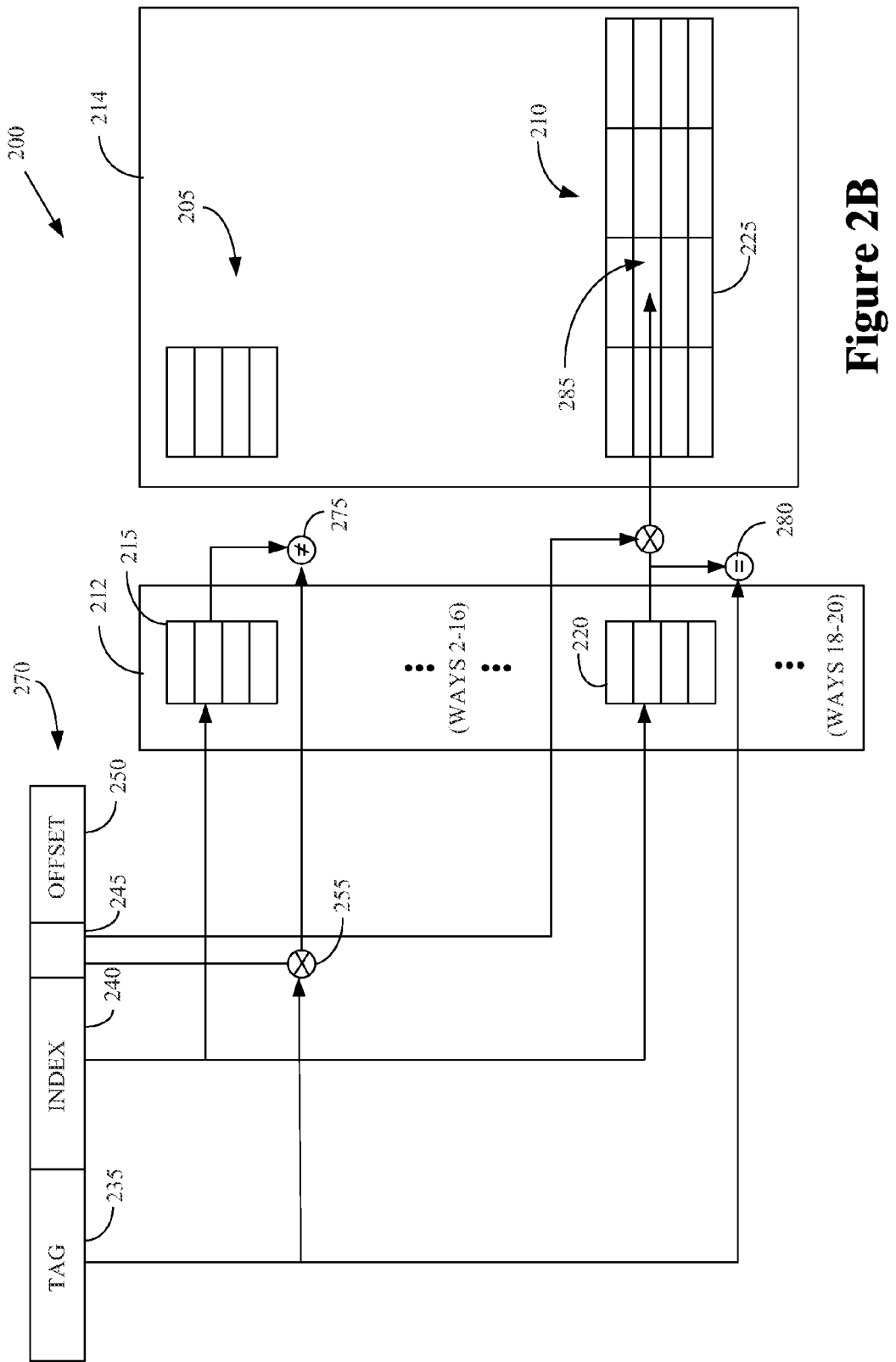
FIG. 2B conceptually illustrates a first exemplary embodiment of a cache that is partitioned into a non-sectored array and a sectored array.

FIG. 2B conceptually illustrates a second exemplary embodiment of the cache 200 that is partitioned into the non-sectored array 205 and the sectored array 210. The embodiment of the cache 200 depicted in FIG. 2B has the same structure as the cache 200 depicted in FIG. 2A. The first and second exemplary embodiments differ in that a different physical address 270 is used to determine whether there is a cache hit or miss. In the embodiment depicted in FIG. 2B, the index 240 indicates that the second index in each way should be examined to detect potential cache hits and/or cache misses. The tag 235 and the selector bits 245 are concatenated (at 255) and compared to the tags at the appropriate index location in the non-sectored portion of the tag array 212. The tag 235 is compared to the tags at the appropriate index location in the sectored portion of the tag array 212. In the illustrated embodiment, the concatenated tag 235 and selector bits 245 are determined (at 275) to be different than the tag at the appropriate index location in the first way 215. A cache miss is therefore identified. A cache hit is detected in the 17th way 220 because the tag 235 is determined (at 280) to be equal to the tag in the 17th way of the tag array 220. The selector bits are then used to select the sub-block 285 in the corresponding line in the 17th way 220 associated with the first index in the sectored array 210 to retrieve the requested information.

Figure 3:
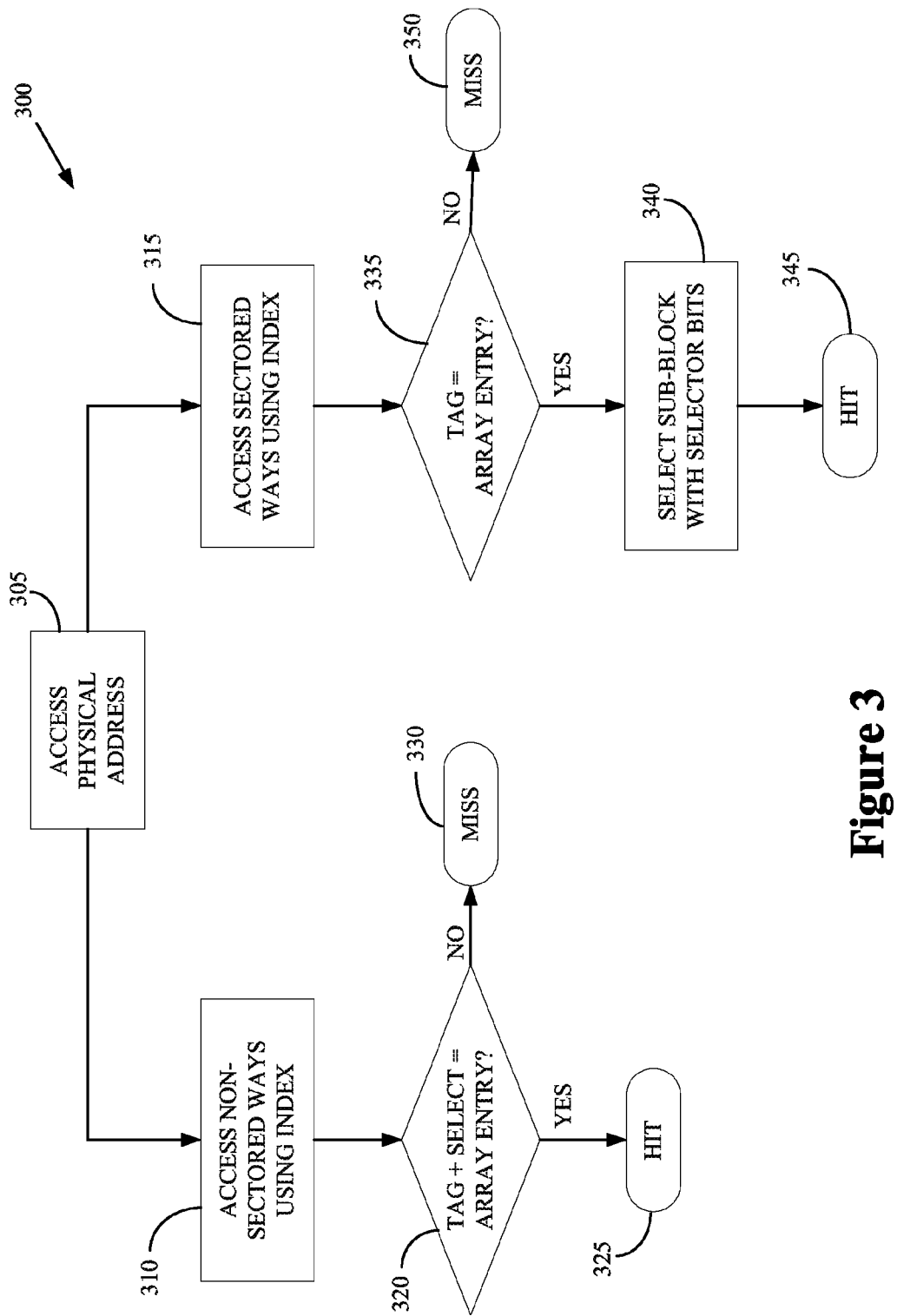
FIG. 3 conceptually illustrates one exemplary embodiment of a method for accessing a cache that has been partitioned into a non-sectored array and a sectored array.

FIG. 3 conceptually illustrates one exemplary embodiment of a method 300 for accessing a cache that has been partitioned into a non-sectored array and a sectored array. In the illustrated embodiment, a physical address is accessed (at 305). For example, a processor core associated with the cache may request information stored at the physical address in a memory. The cache may then be searched to determine whether the requested information is in the cache. In the illustrated embodiment, the non-sectored ways and the sectored ways can be searched concurrently (e.g., in parallel) to detect cache hits and/or cache misses. For example, an index derived from the physical address can be used to access (at 310) ways associated with the non-sectored array in the cache concurrently with accessing (at 315) ways associated with the sectored array of the cache.

Different criteria may be used to detect cache hits and/or cache misses in the two concurrent and/or parallel branches of the method 300. In the illustrated embodiment, cache hits and/or misses in the non-sectored array can be detected by determining (at 320) whether the concatenated tag and selector bits from the physical address are equal to an entry in the non-sectored tag array corresponding to the index. If the concatenated tag and selector bits are equal to the entry, then a cache hit is issued (at 325). Otherwise, a cache miss is issued (at 330). In the illustrated embodiment, cache hits and/or misses in the sectored array can be detected by determining (at 335) whether the tag is equal to an entry in the sectored tag array corresponding to the index. If the tag is equal to the tag array entry, then the selector bits may be used to select (at 340) the appropriate sub-block associated with the tag and a cache hit is issued ((at 345). Otherwise, a cache miss is issued (at 350).

Embodiments of the techniques described herein may realize a savings in tag area because a smaller tag array can be built for the sectored partition of the data array. In one embodiment, the sectored ways can be configured to hold the data from memory accesses amenable to sequential pre-fetching. The non-sectored ways can be used for demand accesses that do not conform to sequential pre-fetching, thereby avoiding the extra power and/or performance penalty of fetching a wider sectored line for every way in the cache. The tag area can also be optimized by relying on the nature of sequential accesses in programs or applications to partially sector cache lines. Embodiments of the techniques described herein may therefore avoid the increase in memory traffic that is often seen in fully-sectored caches by maintaining a group of non-sectored lines within the design. Implementing a static partition of cache tags may avoid the complexity of allocating tags dynamically to data lines. Embodiments of the techniques described herein may also avoid the overhead needed to use pointers to link lines/blocks in caches that dynamically allocate tags to lines/blocks.

Embodiments of processor systems that can implement partially sectored caches as described herein (such as the semiconductor device 100) can be fabricated in semiconductor fabrication facilities according to various processor designs. In one embodiment, a processor design can be represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. An apparatus, comprising:
    a cache comprising:
        a tag array for storing information indicating a plurality of tags; and
        a data array for storing a plurality of lines, wherein the cache includes a first non-sectored portion and a second sectored portion, a first portion of the tags having a one-to-one association with a first portion of the lines in the first non-sectored portion and a second portion of the tags having a one-to-many association with a second portion of the lines in the second sectored portion, wherein the cache is operable to employ a common index portion of a physical address for accessing tags associated with the first non-sectored portion and the second sectored portion, the cache is configured to use tag bits and at least one selector bit from the physical address to determine whether a copy of the information stored at the physical address is located in the first portion of the lines, and the cache is configured to use the tag bits to determine whether the copy is located in the second portion of the lines and to use said at least one selector bit to select one of a plurality of lines indicated by the tag bits in response to determining that the copy is located in the second portion.

2. The apparatus set forth in claim 1, wherein the cache is a multiple-way associative cache, and wherein the first portion of the lines corresponds to a first portion of ways of the cache, and wherein the second portion of the lines corresponds to a second portion of the ways of the cache.

3. The apparatus set forth in claim 1, wherein the cache is configured to perform a tag lookup in the tag array to identify at least one of the lines that includes a copy of information stored at the physical address.

4. The apparatus set forth in claim 3, wherein the cache is configured to perform the tag lookup on the first portion of the tags concurrently with the tag lookup on the second portion of the tags.

5. The apparatus set forth in claim 1, comprising a prefetcher configured to fetch information from a main memory and write the information to the second portion of the lines, the fetch information being selected to be sequential with at least one physical address associated with the second portion of the lines.

6. The apparatus set forth in claim 5, wherein the prefetcher is configured to fetch information from the main memory that is sequential with one of the second portion of tags associated with said at least one physical address, and to write the information into one of the second portion of lines that is associated with said one of the second portion of tags.

7. The apparatus set forth in claim 1, wherein the cache is configured to write information to the first portion of the lines when said information is not sequential with at least one physical address associated with the first portion of the lines.

8. The apparatus set forth in claim 7, wherein the cache is configured to write information to at least one line in the first portion of the lines when said information is not sequential with at least one physical address associated with the first portion of lines and said at least one line in the first portion of lines is available.

9. An apparatus, comprising:
    means for storing information indicating a plurality of tags;
    means for storing a plurality of lines, wherein a first portion of the tags have a one-to-one association with a first portion of the lines defining a non-sectored portion and a second portion of the tags have a one-to-many association with a second portion of the lines defining a sectored portion;
    means for identifying tags in the first and second portions related to a physical address using a common index portion of the physical address;
    means for using tag bits and at least one selector bit from the physical address to determine whether a copy of the information stored at the physical address is located in the first portion of the lines; and
    means for using the tag bits to determine whether the copy is located in the second portion of the lines and said at least one selector bit to select one of a plurality of lines indicated by the tag bits in response to determining that the copy is located in the second portion.

10. A method, comprising:

storing information indicating a plurality of tags in a tag array of a cache;

storing a plurality of lines in a data array of the cache, wherein a first portion of the tags have a one-to-one association with a first portion of the lines in a non-sectored portion of the cache and a second portion of the tags have a one-to-many association with a second portion of the lines in a sectored portion of the cache;

identifying tags in the first and second portions related to a physical address using a common index portion of the physical address;

using tag bits and at least one selector bit from the physical address to determine whether a copy of the information stored at the physical address is located in the first portion of the lines; and using the tag bits to determine whether the copy is located in the second portion of the lines and said at least one selector bit to select one of a plurality of lines indicated by the tag bits in response to determining that the copy is located in the second portion.

11. The method set forth in claim 10, wherein the cache is a multiple-way associative cache, and wherein storing lines in the first portion of the lines comprises storing lines in a first portion of ways of the cache, and wherein storing lines in the second portion of the lines comprises storing lines in a second portion of the ways of the cache.

12. The method set forth in claim 10, performing a tag lookup in the tag array to identify at least one of the plurality of lines that includes a copy of information stored at the physical address.

13. The method set forth in claim 12, wherein performing the tag lookup comprises performing the tag lookup on the first portion of the tags concurrently with the tag lookup on the second portion of the tags.

14. The method set forth in claim 10, comprising fetching information from a main memory and writing the information to the second portion of the lines, the fetch information being selected to be sequential with at least one physical address associated with the second portion of the lines.

15. The method set forth in claim 14, wherein fetching the information comprises fetching information that is sequential with one of the second portion of tags associated with said at least one physical address, and wherein writing the information comprises writing the information into one of the second portion of lines that is associated with said one of the second portion of tags.

16. The method set forth in claim 10, comprising writing information to the first portion of the lines when said information is not sequential with at least one physical address associated with the second portion of the lines.

17. The method set forth in claim 16, comprising writing information to at least one line in the first portion of the lines when said information is not sequential with at least one physical address associated with the first portion of lines and said at least one line in the first portion of lines is available.

18. A non-transitory computer readable media including instructions that when executed can configure a manufacturing process used to manufacture a semiconductor device comprising:

a cache comprising:

a tag array for storing information indicating a plurality of tags; and a data array for storing a plurality of lines, wherein the cache includes a first non-sectored portion and a second sectored portion, a first portion of the tags having a one-to-one association with a first portion of the lines in the first non-sectored portion and a second portion of the tags having a one-to-many association with a second portion of the lines in the second sectored portion, wherein the cache is configured to employ a common index portion of a physical address for accessing tags associated with the first non-sectored portion and the second sectored portion, to use tag bits and at least one selector bit from the physical address to determine whether a copy of the information stored at the physical address is located in the first portion of the lines, and to use the tag bits to determine whether the copy is located in the second portion of the lines and to use said at least one selector bit to select one of a plurality of lines indicated by the tag bits in response to determining that the copy is located in the second portion.

19. The computer readable media set forth in claim 18, wherein the computer readable media is configured to store at least one of hardware description language instructions or an intermediate representation.

20. The computer readable media set forth in claim 18, wherein the instructions when executed configure generation of lithography masks.

* * * * *